(12) United States Patent
Claes et al.

(10) Patent No.: US 8,751,617 B2
(45) Date of Patent: Jun. 10, 2014

(54) METHOD AND DEVICE FOR IDENTIFYING AND SELECTING AN INTERFACE TO ACCESS A NETWORK

(75) Inventors: Stan Claes, Willebroek (BE); Dirk Van De Poel, Aartselaar (BE); Stephen Vincent, Atlanta, GA (US)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 12/310,302

(22) PCT Filed: Aug. 6, 2007

(86) PCT No.: PCT/EP2007/058117
§ 371 (c)(1),
(2), (4) Date: Jan. 14, 2010

(87) PCT Pub. No.: WO2008/022902
PCT Pub. Date: Feb. 28, 2008

(65) Prior Publication Data
US 2010/0121946 A1    May 13, 2010

(30) Foreign Application Priority Data
Aug. 23, 2006   (EP) .................................. 06447098

(51) Int. Cl.
*G06F 15/173* (2006.01)
(52) U.S. Cl.
USPC .......................................... 709/223; 709/225
(58) Field of Classification Search
USPC ........................................................ 709/223
See application file for complete search history.

(56) References Cited

U.S. PATENT DOCUMENTS

| | | | | |
|---|---|---|---|---|
| 5,172,372 | A | * | 12/1992 | Konishi .......................... 370/401 |
| 6,169,741 | B1 | * | 1/2001 | LeMaire et al. ............... 370/401 |
| 6,822,955 | B1 | * | 11/2004 | Brothers et al. ............... 370/389 |
| 6,940,814 | B1 | * | 9/2005 | Hoffman ........................ 370/235 |
| 7,233,994 | B1 | | 6/2007 | Koga et al. |
| 7,280,547 | B2 | * | 10/2007 | Featherston et al. .......... 370/401 |
| 7,305,492 | B2 | * | 12/2007 | Bryers et al. .................. 709/249 |
| 7,333,432 | B1 | * | 2/2008 | Mor et al. .................... 370/230.1 |
| 7,359,389 | B2 | * | 4/2008 | Kusayanagi ................... 370/401 |
| 7,460,488 | B2 | * | 12/2008 | Mayernick .................... 370/254 |
| 7,769,037 | B2 | * | 8/2010 | Booth et al. ................... 370/419 |
| 2002/0013840 | A1 | * | 1/2002 | Border et al. ................. 709/224 |

(Continued)

FOREIGN PATENT DOCUMENTS

| | | |
|---|---|---|
| JP | 2001160829 | 6/2001 |
| JP | 2004235722 | 8/2004 |
| JP | WO2004095278 | 11/2004 |

OTHER PUBLICATIONS

J. Kuri: "Pauschalreise Internet-Zugang Fuer Mehrere Rechner Ueber Das Lokale Netzwerk" CT Magazin Fuer Computer Technik, Heise Zeitschriften Verlag, Hannover, DE, No. 18, Aug. 28, 2000, pp. 140-143, XP000963036.

(Continued)

*Primary Examiner* — Gerald Smarth
(74) *Attorney, Agent, or Firm* — Myers Wolin LLC (57) ABSTRACT

The present invention concerns a networking device comprising interfacing means for accessing a first network or a second network, and comprising identifying means for detecting an access to the first network, and selecting means for picking an access among a plurality of accesses to the first network for accessing a third network.

9 Claims, 3 Drawing Sheets

(56) References Cited

U.S. PATENT DOCUMENTS

| | | |
|---|---|---|
| 2002/0027906 A1* | 3/2002 | Athreya et al. ............... 370/386 |
| 2002/0049862 A1* | 4/2002 | Gladney et al. .............. 709/250 |
| 2002/0176426 A1* | 11/2002 | Asano et al. ................. 370/401 |
| 2002/0178268 A1* | 11/2002 | Aiken et al. .................. 709/228 |
| 2003/0058894 A1* | 3/2003 | Feuerstraeter et al. ....... 370/518 |
| 2003/0108051 A1* | 6/2003 | Bryden et al. ........... 370/395.54 |
| 2003/0123462 A1* | 7/2003 | Kusayanagi ................. 370/401 |
| 2003/0142680 A1* | 7/2003 | Oguchi ........................ 370/400 |
| 2003/0210706 A1* | 11/2003 | Chang et al. ................. 370/466 |
| 2004/0071164 A1* | 4/2004 | Baum .......................... 370/469 |
| 2004/0114610 A1* | 6/2004 | Featherston et al. .......... 370/401 |
| 2005/0047713 A1* | 3/2005 | Antosik .......................... 385/24 |
| 2005/0102406 A1 | 5/2005 | Moon |
| 2005/0172024 A1* | 8/2005 | Cheifot et al. ................ 709/225 |
| 2005/0193105 A1* | 9/2005 | Basham et al. ............... 709/223 |
| 2007/0025372 A1* | 2/2007 | Brenes et al. ................. 370/401 |
| 2008/0317039 A1* | 12/2008 | Satterlee et al. ........... 370/395.5 |
| 2010/0121946 A1* | 5/2010 | Claes et al. ................... 709/223 |

OTHER PUBLICATIONS

Search Report Dated January 9, 2008.

* cited by examiner

METHOD AND DEVICE FOR IDENTIFYING AND SELECTING AN INTERFACE TO ACCESS A NETWORK

This application claims the benefit, under 35 U.S.C. §365 of International Application PCT/EP2007/058117, filed Aug. 6, 2007, which was published in accordance with PCT Article 21(2) on Feb. 28, 2008 in English and which claims the benefit of European patent application No. 06447098.2, filed Aug. 23, 2006.

The present invention relates to a method and a device for identifying and selecting an interface to access a network.

A telecommunication operator deploys different kinds of networks to offer telecommunication services to its customers. Various broadband solutions may be deployed among which technologies over unshielded twisted pair, such as the digital subscriber line services, noted DSL services, satellite transmissions or broadband over coaxial copper, etc. . . . To receive the DSL services, the end user utilizes a gateway that embeds among others the DSL modem functionality. DSL comprises various DSL technologies that provide various transmission rates and transmission ranges and constantly evolve to provide higher performances. An end user of Asymmetric DSL2+ services, noted ADSL2+ services and defined in ITU G.992.5 Annex M, provided by an operator has a gateway with an embedded ADSL2+ modem. The operator regularly upgrades its network with more efficient access technologies. It may for example replace the ADSL2+ with a very high bit rate DSL2, noted VDSL2, and defined in the ITU-T G.993.2 Standard, or fiber optics. The operator would like to have the possibility to avoid the substitution of all the gateways; usually the gateway comprises embedded functionalities, such as voice over IP, that are reusable. The operator would like to provide customers with a VDSL2 or fiber Ethernet bridge device only, which is to be connected to the gateway. This would require each end-user to configure the gateway in order to no longer use the ADSL port but use a specific Ethernet port as the WAN/Internet interface. This is a complex and risky task. The user is also not always competent to easily manage the different ports of the gateway, among which the ports dedicated to local area network traffic or to wide area network traffic.

It is desirable to facilitate and secure the use of a gateway that may connect to different type of devices and networks.

US 2004/114610 A1 (FEATHERSTON LORD NIGEL [US] ET AL) 17 Jun. 2004 discloses a method and system for automatically detecting a WAN connection among a plurality of communication ports.

The present invention concerns a networking device comprising interfacing means for accessing a first network or a second network, and comprising identifying means for detecting an access to the first network, and selecting means for picking an access among a plurality of accesses to the first network for accessing a third network.

The networking device permits to connect an interface to a first network or to a second network. The second network permits the device to access a third network. To access a third network, the device detects the first networks, and selects a first network to access the third interface. The end user of the device does not have to configure the device for accessing the third network, and does not have to pay attention to the interface to which it plugs a cable. It may plug a cable to any interface for an access to a first or to a second network type.

According to an embodiment of the invention, the interfacing means comprises a plurality of interfaces adapted to connect either to the first network or to the second network, the interface that connects to the first network being a first interface.

According to an embodiment of the invention, the identifying means is adapted to request an access to the network through all the interfaces simultaneously, and to identify an interface that receives a response to the request as a first interface.

The device does not pre-identify the interface types. When the device needs to access the third network, it performs the detection of all the possible solutions to access the third network and selects the most appropriate one.

According to an embodiment of the invention, the selecting means is adapted to set up a selection rule for selecting a first interface for accessing a third network, and is adapted to apply the selection rule to the detected first interfaces.

The selection rule may be amended by remote configuration or by the end user. And the device applies the amended rules.

According to an embodiment of the invention, the identifying means is adapted to identify an interface to a second network, the interfaces that provide an access to the second network being a second interface, and is adapted to request an access to the third network through the all interfaces but the second interfaces.

The device detects the interfaces that provide access to the second network, and that do not provide access to the first network. Then it does not consider these interfaces when detecting the first interfaces.

According to an embodiment of the invention, the interfacing means comprises at least an interface adapted to simultaneously access the first network and the second network.

An interface is not limited to a single network. It may provide access to several network types. The device may then comprise a single interface as such.

According to an embodiment of the invention, the identifying means is adapted to identify a second device connected to an interface, the device being adapted to connect to the second network.

The second device is automatically detected and the networking device configures itself on the detection of the second device.

According to an embodiment of the invention, the device comprises means for identifying the reception of a traffic specific to the second network.

The detection of the second device is done in a passive manner. The networking device only listens to the traffic that it receives. The detection does not require the networking device to ping any device.

According to an embodiment of the invention, the first network is a wide area network and the second is a local area network.

According to an embodiment of the invention, the third network is the Internet network.

The invention also relates to a method for accessing a network, in a device comprising a plurality of interfaces adapted to connect to a first network or/and to a second network, the interface connected to the first network being a first interface, comprising at the level of the device the steps of identifying the first interfaces among the interfaces, and selecting an interface, among the first interfaces of the device, to access the network.

According to an embodiment of the invention, the step of identifying comprises the steps of broadcasting a request for an access to the network to all the interfaces simultaneously, receiving an answer to the request from some interfaces, and identifying an interface that receives an answer to the request as a first interface.

Another object of the invention is a computer program product comprising program code instructions for executing the steps of the process according to the invention, when that program is executed on a computer. By "computer program product", it is meant a computer program support, which may consist not only in a storing space containing the program, such as a diskette or a cassette, but also in a signal, such as an electrical or optical signal.

The invention will be better understood and illustrated by means of the following embodiment and execution examples, in no way limitative, with reference to the appended figures on which.

Figure 1:
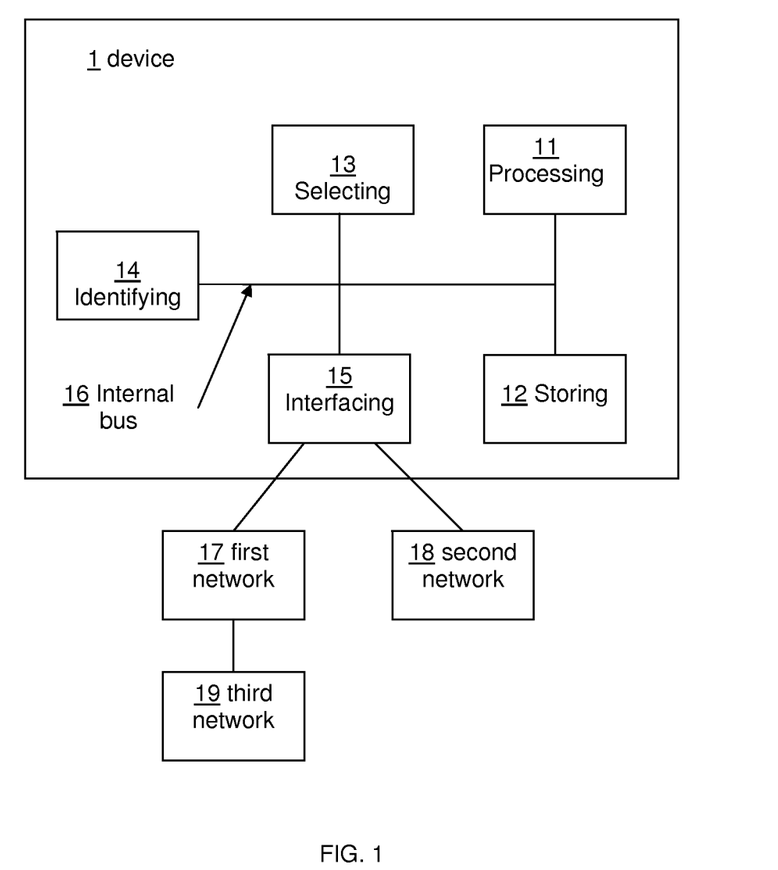
FIG. 1 is a block diagram of an object compliant with the embodiment.

In FIG. 1, the represented blocks are purely functional entities, which do not necessarily correspond to physically separate entities. Namely, they could be developed in the form of software, or be implemented in one or several integrated circuits.

The exemplary embodiment comes within the framework of a gateway comprising interfaces to access LAN and WAN, but it is not limited to this particular environment and may be applied within other frameworks where a terminal comprises an interface that may connect to several networks of different type.

The FIG. 1 represents the gateway device 1 according to the embodiment. It comprises interfacing module 15 adapted to connect to a first network 17 or/and to a second network 18. According to the embodiment, the interfacing module is adapted to connect to a Local Area Network, noted LAN, or to a Wide Area Network, noted WAN. The end user of the gateway device may connect the interface to a LAN and/or to a WAN, and the gateway comprises an identifying module 14 for detecting when a LAN device connected to an interface and for identifying a WAN connection at an interface. The device may have several WAN connections. A WAN connection may be used to connect the device to a third network (19), which is the Internet. The device comprises a selecting module 13 for selecting one or more WAN connections among all the WAN connections available for accessing the Internet. The selection may be done on a preconfigured selection rule. The device comprises a processing module 11 capable of executing programs stored in a storing module 12. Data circulate between different modules of the device through the internal bus 16.

Figure 2:
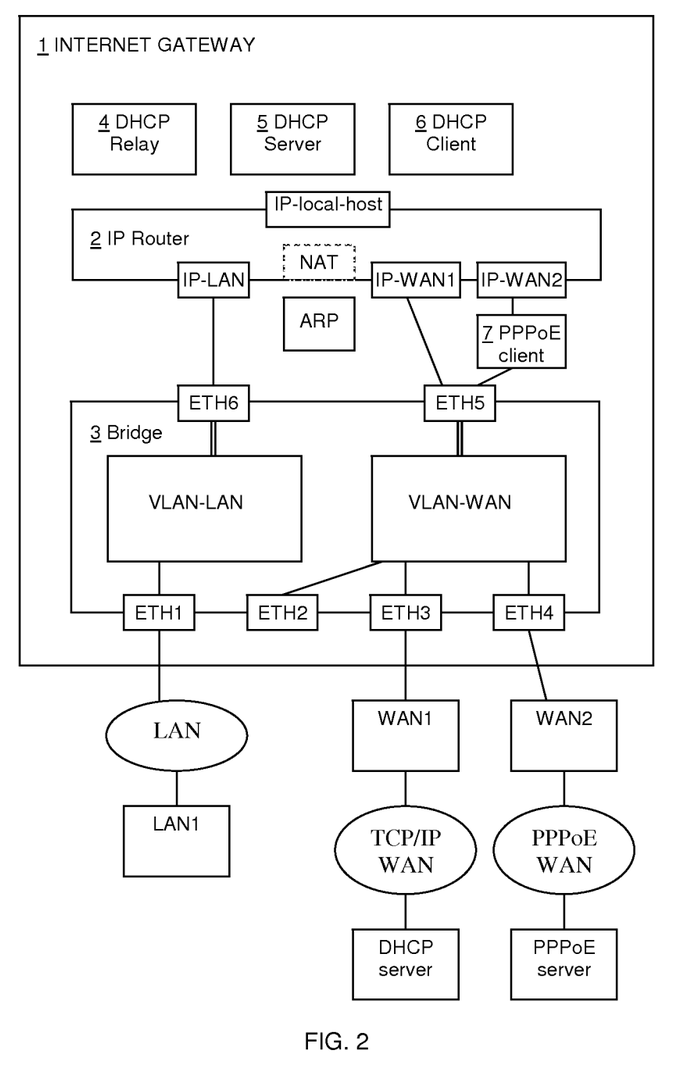
FIG. 2 is a block diagram of the device according to the embodiment.

The device of the embodiment is described in more details hereafter. The FIG. 2 represents the device of the embodiment, which is an Internet gateway, with the connections to a local area network, noted LAN, and to the wide area networks, noted WAN. The LAN is an Ethernet network and comprises LAN devices only; one LAN device is represented in the FIG. 2, LAN1. Two WAN devices, WAN1 and WAN2, respectively provide access to two WAN types, a PPPoE WAN, and a TCP/IP WAN, that are further described below. The LAN is connected to the ETH1 port. The WAN1 is connected to the ETH3 port, and the WAN2 is connected to the ETH4 port. Hereafter a WAN provides access to a server; and the gateway registers to the server to access the Internet. A gateway may comprise a plurality of WAN but only use some of them to access the Internet. The gateway does not necessarily use all the WAN to access the Internet.

The point to point protocol, noted PPP, is defined in the Request for Comment document version 1661, noted RFC1661, from the Internet Engineering Task Force, noted IETF. It provides a method for transporting multi-protocol datagram over point-to-point links. PPP connection is typically used for Internet access because it supports user authentication and dynamic retrieval of a public IP address. PPPoE is a method for transmitting PPP over Ethernet and is defined in the RFC2516. To establish Internet connectivity, a PPPoE client module dynamically retrieves a public IP address. PPPoE is used for establishing a connection to the Internet through a PPPoE server performing authentication and dynamically receiving a public IP address. PPPoE is a point-to-point connection on top of Ethernet. Frames are sent to the PPPoE server MAC address, and everything that goes in at the gateway comes out at the PPPoE server and the other way around. The TCP/IP WAN means here a WAN that is built on TCP/IP but not on PPPoE. The TCP/IP WAN comprises a DHCP server for dynamic IP address assignment. With DHCP, the gateway receives a public IP address. This is the IP address to send all data destined for the Internet to. The gateway uses the Ethernet Address Resolution Protocol according to the RFC826, noted ARP, on this IP address to learn the MAC address to send all Internet data to.

In the embodiment, the LAN interface is an Ethernet interface. The interface is accessed by the bridge and identified as a bridge port. The Ethernet interface could be any other logical Ethernet interface, which is a physical interface type supporting transmission of Ethernet frames, such as:

Digital Subscriber Line that sends Ethernet frames, when the gateway embeds a Digital Subscriber Line modem, Universal Serial Bus that sends Ethernet frames, according to the remote Network Driver Interface Specification, or IEEE802.11b/g Wireless LAN interface.

The embodiment that applies to the Ethernet interface is also applicable to any such logical interfaces.

The bridge 3 is a Virtual Local Area Network Ethernet bridge capable, noted VLAN bridge capable, according to the IEEE802.1Q standard on Virtual Bridged Local Area Networks, 2003 Edition. It comprises several ports, ETH1 to ETH6, noted bridge ports. It bridges Ethernet frames between bridge ports; it forwards a frame received at one port to a set of other ports. The bridge is VLAN capable; it comprises means for assigning a VLAN to a port, and bridging frames between ports belonging to the same VLAN. Multiple VLAN's are supported by the bridge.

The bridge comprises two kinds of VLAN; a VLAN referenced to as "VLAN-LAN", and a VLAN referenced to as "VLAN-WAN". As they are used for internal purposes only, no egress VLAN tagging is performed, and any unique VLAN ID can be assigned. The VLAN-LAN is the VLAN defined in the gateway for the traffic related to the LAN. VLAN-WAN is the VLAN defined in the gateway for the traffic related to the WAN. In the FIG. 2, the port ETH1 belongs to the VLAN-LAN, and the ports ETH3 and ETH4 belong to the VLAN-WAN. The port TH2 belongs by default to the VLAN-WAN. The purpose of the VLAN is to bridge between all ports belonging to the VLAN. Traffic is sent to the internal router interface, ETH6, when the Ethernet frame destination MAC address equals to the Gateway router MAC address, taking the VLAN of the frame into account. The frame is only sent to the router when the router port belongs to the same VLAN as the frame.

The bridge comprises filtering rules for the VLAN-WAN to constrain the forwarding. The router initiated broadcasts are sent to all ports except the port attached to the router, and non-router-initiated broadcasts are only sent to the port attached to the router. This prevents DHCP message from LAN devices to be sent to the WAN. ARP is supported for device connected to the VLAN-LAN, and is not supported amongst external devices connected to VLAN-WAN.

A PPPoE client module 7 operates on top of an Ethernet interface, the internal Ethernet interface belonging to VLAN-WAN. One or more PPPoE clients are responsible for initiating PPPoE service discovery and establishing a PPPoE session with a PPP connection.

The IP router's primary task is to forward incoming IP packets on an IP interface towards an outgoing interface. To take this forwarding decision, a lookup is done in a Forwarding Information Base of the router 2, not represented, to match the packet destination IP address against configured routes. In addition, the router includes functionality like Network Address Translation, as defined in the RFC1631, and noted NAT, and also a firewall not represented. For outgoing packets, for example from a local area network to the Internet, the NAT translates the source IP address into the single public IP address of the Gateway. To support multiple LAN devices, also the source UDP or TCP port is translated in a manner well known per se.

The IP Router comprises several types of IP Interfaces. It forwards IP packets from an IP interface to another IP interface. IP interfaces have zero or more IP addresses configured. The IP interfaces are:

IP-LAN: an IP interface configured on top of the VLAN-LAN. This IP interface is the router interface with the local network. It typically has a private network IP address configured on it.

IP-WAN: an IP interface configured on top of VLAN-WAN or a PPPoE client. This depends on the service provider network model. It is the router interface with the Internet with typically a public IP address, usually dynamically configured on it.

IP-local-host: the IP interface to the local gateway TCP/UDP applications and modules.

The ARP module provides a mechanism to map an IP address to a hardware address, for example the Ethernet MAC address, according to the Address Resolution Protocol defined in the RFC826.

The gateway embeds at least a DHCP client 6, and may embed a plurality of DHCP clients. The Dynamic Host Configuration Protocol, noted DHCP, is defined in the RFC2131. When using DHCP to establish Internet connectivity (to dynamically retrieve a public IP address), a DHCP client module is configured to operate on top of an IP interface of an IP router. The DHCP client module is configured on top of the IP-WAN, which is configured on top of the VLAN-WAN IP router Ethernet interface. The DHCP client is used to dynamically and automatically request an IP address to a DHCP server located on the Internet. Multiple DHCP clients permit to request multiple internet addresses for multiple Internet accesses.

The DHCP-relay module 4 inspects incoming DHCP messages and either sends/relays them to the internal DHCP server 5 or to an external DHCP server located for example on the Internet. It bases the decision on the source IP interface on which the DHCP message arrived, the DHCP client MAC address or part of it and/or a number of DHCP message option value checks well known per se.

A DHCP server module 5 is embedded in the gateway. The gateway typically acts as DHCP server for the local network, automatically assigning local IP addresses out of a pre-configured DHCP pool, a range of addresses.

Depending on the service provider network, either PPPoE or DHCP mechanisms are used to dynamically request a public IP address.

The mechanism for the configuration of the bridge comprises the following steps. The gateway is preconfigured with all Ethernet ports belonging to VLAN-WAN. This means the gateway considers all Ethernet ports as being WAN-side interface over which Internet connectivity can be established.

As soon as a LAN device is connected to a port of the gateway, the LAN device initiates a DHCP-discover message to request an IP address. This DHCP-discover message is sent as IP and Ethernet broadcast with IP protocol being UDP and destination port number 67. On reception of a DHCP-discover message on a WAN port, the gateway configures as follows. As all Ethernet ports are configured to belong to the VLAN-WAN, the bridge is constrained to send the frame only to the IP router Ethernet port. The IP router sends the IP broadcast to the internal IP-local-host interface, where the DHCP-relay module is listening on a UDP socket on port 67. The DHCP-relay inspects the DHCP-discover message in order to decide where to forward the message to. The relay detects that the DHCP-discover message is coming from an IP-WAN interface. DHCP-discover messages arriving at the gateway are necessarily sent by LAN devices. There is no usage scenario for a gateway acting as DHCP server to the Internet. The DHCP-relay then knows a LAN device is connected to a gateway Ethernet interface which is belonging to VLAN-WAN. The DHCP-relay decides not to forward or relay the DHCP message but changes the bridge configuration. It configures the bridge to have the Ethernet interface on which the DHCP message was received to no longer belong to VLAN-WAN but to belong to VLAN-LAN. The LAN device MAC address is indicated to the bridge to be reachable via a particular bridge port.

As a DHCP-discover is a broadcast message, it may be received by a DHCP server located on the Internet or on the access network. A DHCP server usually performs conditional serving; it is able to distinguish between a request from the gateway, having a public IP address, and a request from a LAN device with a private IP address, and deciding not to respond to LAN device requests. The gateway sends special information in the DHCP vendor class option for a DHCP server to easily recognize gateway DHCP-discovers messages.

During the configuration, the gateway has not provided the LAN device with an IP address. The LAN device retries sending a DHCP-discover message. Because of the automatically updated bridge configuration, this Ethernet frame coming from this LAN device is now bridged in VLAN-LAN. The DHCP-discover is a broadcast message, it is sent to all ports including the IP router bridge port except the originating one. The IP router sends the IP broadcast to the internal IP-local-host interface, where the DHCP-relay module 4 is listening on a UDP socket on port 67. The DHCP-relay inspects the DHCP-discover message in order to decide where to forward the message to. The relay detects that the message is coming from the IP-LAN interface. The DHCP message is forwarded to the internal DHCP server. The internal DHCP server responds to the message with a DHCP-offer message containing a local network private IP address. In order to reserve the IP address, the LAN device sends a DHCP-request message to the server. The server then sends a DHCP-ack message to the device to confirm the reservation.

The gateway DHCP server responds with a DHCP-offer message, offering the LAN device a private IP address. This DHCP-offer also includes the gateway IP address, for example 192.168.1.254, as DNS server and IP network default gateway. As the gateway is the "IP network default gateway", all LAN devices send any IP packet that is not destined for a LAN device within the same network, for example on the range of addresses 192.168.0.0/16, to the "IP network default gateway". An ARP message is broadcast by each LAN device to learn the MAC address associated with the "IP network default gateway". The Gateway responds to the ARP request, so the LAN devices know that the IP address 192.168.1.254 corresponds to the Ethernet MAC address ETH6. The WAN device can be configured not to send ARP requests to the Internet; moreover, as the gateway private IP address is not a valid public IP address, no entity in the service provider access network responds to the ARP request.

In order to configure its ports, the gateway comprises detecting means for detecting LAN traffic, and configuring means for configuring the gateway modules. In the embodiment, it comprises a DHCP-relay module that detects DHCP-discover messages sent by a LAN device, and configures the gateway accordingly. In a variant embodiment, the gateway uses another means for detecting a LAN device connected to a port. The gateway reads the source IP address of the emitter of the received packet. If the address is a private IP address, the device is a LAN device. The ARP table then permits the gateway to identify the MAC address of the LAN device and configure the bridge to map the MAC address to a port. The bridge as part of its MAC address learning function always remembers which MAC address is reachable from which port. It keeps <VLAN, MAC address, source port> information to base its Ethernet frame forwarding on. The bridge port can then be switched to a VLAN-LAN.

The gateway may know when a LAN device is no longer connected to a port. The DHCP server of the gateway comprises a DHCP-lease table that maintains the list of IP addresses of the LAN devices. It may combine the list to the port information to know which device is attached to which port. The DHCP server knows when no devices are attached on an interface after expiration or release of all DHCP-leases on a port. The DHCP server may then reconfigure the bridge to switch the port that has no DHCP-lease to a VLAN-WAN port.

The WAN device is typically an Ethernet bridge device. It does not have an IP address but forwards Ethernet frames between the physical Ethernet LAN and the WAN.

The WAN device might be, in some very rare cases, an IP router. The router has its own public IP address. It might be a DHCP server to the Gateway, or might forward the gateway DHCP discover to the service provider DHCP server. The WAN device might be a PPPoE access concentrator but probably might forward PPPoE messages from the gateway to the service provider PPPoE Access concentrator. Anyway, the gateway of the embodiment would still request its global IP address via PPPoE or DHCP.

The mechanism for the configuration of ports detects the LAN ports, and configures the gateway accordingly. It considers that all other ports are WAN ports, without any specific checking whether it is a WAN port. The sole verification is performed for the LAN ports and is passive; the gateway does not send any specific packet to verify the LAN port, but it passively listens to the traffic received at the interface. A precise verification of the WAN ports is not required by the Internet connection establishment mechanism as indicated below.

The gateway comprises means for making attempts to establish Internet connectivity. The connection establishment may occur at the gateway startup, or at any other moment that is configurable. The trigger for connection establishment may be:

Always on: it is setup automatically at startup or loss of a connection. When the gateway is switched on, the initialization process of the gateway launches the connection establishment. When the connection is lost, the connection establishment is launched.

Dynamic: it is dynamically triggered by the presence of data destined to the Internet; when data is to be sent a connection is established, and after some idle time, the connection is disconnected.

Under user control: it is the user responsibility to connect and disconnect through the user interface.

The gateway may comprise a plurality of WAN interfaces. The establishment mechanism depends on the network used by the service provider. For example PPPoE active discovery is used on a PPPoE network, DHCP may be used on a TCP/IP network. The gateway can try to establish Internet connectivity using both mechanisms and select the appropriate connection, or select several connections; this is not described in more details in the embodiment. The establishment of the Internet connectivity is described herein with DHCP and PPPoE active discovery. In both case the gateway request for Internet connectivity at all WAN ports simultaneously, and selects a port among the candidates. Of course any other mechanism for Internet connection might be applicable here.

The establishment mechanism with DHCP may be manually triggered by the user of the gateway or be part of the DHCP state machine. At each connection establishment, the DHCP client of the gateway sends out a DHCP-discover message with IP and Ethernet destination being broadcast and IP protocol being UDP, destination port number 67. The bridge sends the broadcast Ethernet frame to all ports belonging to VLAN-WAN except for the originating port. The DHCP-discover is therefore sent to all potential WAN interfaces; a potential WAN interface may possibly be a LAN interface that has not been identified. When at least one Ethernet interface provides a connection to the Internet, at least one DHCP-offer message is received by the gateway from a DHCP server on the Internet. When multiple Internet connections are available, all reachable DHCP servers can respond with a DHCP-offer message. The DHCP-offer message contains the offered IP address. When receiving one or more DHCP-offer messages, the DHCP client has to take a decision on which offered IP address to request. This decision can be based either on offered IP address and/or the WAN port on which the DHCP-offer has been received, as described hereafter:

As there may be a DHCP server located on the LAN, a check is done on the offered IP address. When this IP address is a private IP address, this IP address is not requested. The private IP address allocation is specified in the RFC1918.

The local DHCP client policy configuration can contain a single connection to establish. For example, the service provider or the user has selected a single WAN port or an offered IP address network range. When the DHCP-offer corresponds to the configured entry, a DHCP-request message is sent requesting the offered IP address. When it does not correspond, no Internet connection is established.

The local DHCP client policy configuration can contain multiple connections that are well-ordered by priority and preference. The connections may be identified by combination of service-name, DHCP server name and port in a file located in the memory. When multiple DHCP-offer messages are received, the selecting means of the gateway selects an appropriate connection according to predefined rules. The DHCP-offer messages are matched against the configured connections. If there is a single highest priory matching connection, a DHCP-request message is sent to request this offered IP address. When there are multiple matching connections with equal priority and preference either an additional DHCP client sends a DHCP-discover message to request an additional offered IP address or one address is arbitrarily chosen and requested by sending a DHCP request message. In case of multiple DHCP clients in the gateway, the IP-WAN interface has multiple IP addresses where the routing Forwarding Information Base entries determine which traffic is sent to which IP gateway reachable over the IP-WAN interface.

As soon as the requested public IP address is acknowledged by the DHCP server, the received public IP address is configured on IP-WAN. Internet connectivity is then established between LAN devices and the Internet through the selected WAN.

When using PPPoE to establish Internet connectivity to dynamically retrieve a public IP address, a PPPoE client module operates on top of an Ethernet interface, the internal Ethernet interface belonging to VLAN-WAN. The establishment mechanism with PPPoE may be manually triggered or be part of the PPPoE state machine. At each connection establishment, a PPPoE client initiates a new session/connection by sending out a PPPoE Active Discovery Initiation packet, noted PADI message, as defined in the RFC2516. This message is an Ethernet broadcast frame. The bridge sends the broadcast Ethernet frame to all ports belonging to VLAN-WAN except for the originating port. The message is sent to potential WAN interfaces; a potential WAN interface may possibly be a LAN interface that has not been identified. When at least one Ethernet interface provides a connection to the Internet, at least one PPPoE server, also called an Access Concentrator, responds with a PPPoE Active Discovery Offer packet, noted PADO message. The PADO message comprises the Access Concentrator's name. When receiving one or more PADO messages, the PPPoE client takes a decision on which offered service/connection to establish. After selection, the client sends a PPPoE Active Discovery Request packet, noted PADR message, to the server to request the service/connection to be established. The Access Concentrator sends a PPPoE Active Discovery Session-confirmation packet, noted PADS message, indicating the session is established. The decision is based upon PPPoE service-name, PPPoE access concentrator's name and/or WAN port which is the port on which the PPPoE server MAC address was learned, as described hereafter:

The local PPPoE client policy configuration can contain a single connection to establish. For example, the service provider or the user of the gateway has selected one single PPPoE service and or Ethernet port. When the PADO message corresponds to the configured connection, the client sends a PADR message to the server. When the PADO message does not correspond, no connection is established.

The local PPPoE client policy configuration can contain multiple connections identified for example by combination of service-name, Access Concentrator's name and port, that are well-ordered by priority and or reference. When multiple PADO messages are received, the selecting means of the gateway selects an appropriate connection. PADO messages are matched against the configured connections to identify the highest priority connection to be established. If there is a single highest priority connection, a PADR message is sent to request this service/connection to be established. When there are multiple PADO messages that correspond to multiple locally configured connections with equal priority/preference, a PADR message is sent to request both connections to be established. The PPP Multi-link protocol is used, according to the RFC1990, to combine both connections. After the PPPoE session is established, the PPP connection initiation/negotiation starts. MLPPP is negotiated at PPP level. When there is no matching connection, no connection is requested and established.

As soon as the PPPoE session and PPP connection over it are established, the received public IP address is configured on IP-WAN. Internet connectivity is then established between LAN devices and the Internet through the selected WAN.

The configuration policy is defined by the service provider. The gateway comprises a configuration policy file stored in the persistent memory. This is part of the factory default configuration rules. The file may be upgraded remotely by the service provider.

In another embodiment the gateway device comprises one or more interfaces that are adapted to connect more than one device. The interfaces may connect to a network comprising several devices, the devices being LAN or WAN devices. In this embodiment, the LAN is an Ethernet network and may comprise LAN and WAN devices. The bridge port is multiple VLAN capable. It may belong to multiple VLANs, such as the VLAN-LAN and the VLAN-WAN. The bridge supports VLAN assignment per bridge port and VLAN derivation based upon source MAC address. This means that ingress untagged frames are considered part of a VLAN by the port they arrived on and/or by a check on their source MAC address.

In this embodiment, the bridge detects LAN devices in the passive manner as described above. Whenever a LAN device is detected, the bridge is automatically configured to consider the device as belonging to a particular VLAN, the VLAN-LAN. This is no longer the port that is considered to belong to the VLAN-LAN as in the previous embodiment, but the device is considered to be part of the VLAN-LAN. On a same port two devices may then belong to two different VLANs. All frames sent by this device, i.e. with the device MAC address as source MAC address, are internally treated by the gateway as belonging to this VLAN-LAN. The bridge performs bridge learning mechanism to determine the port of the bride that corresponds to the LAN device, at which the bridge sends the frames with the device MAC address as the destination MAC address. This permits the bridge to bridge the frames within a single VLAN. Of course the bridge could comprise more than one VLAN-LAN, and split the LAN devices into different categories of VLAN-LANs.

Figure 3:
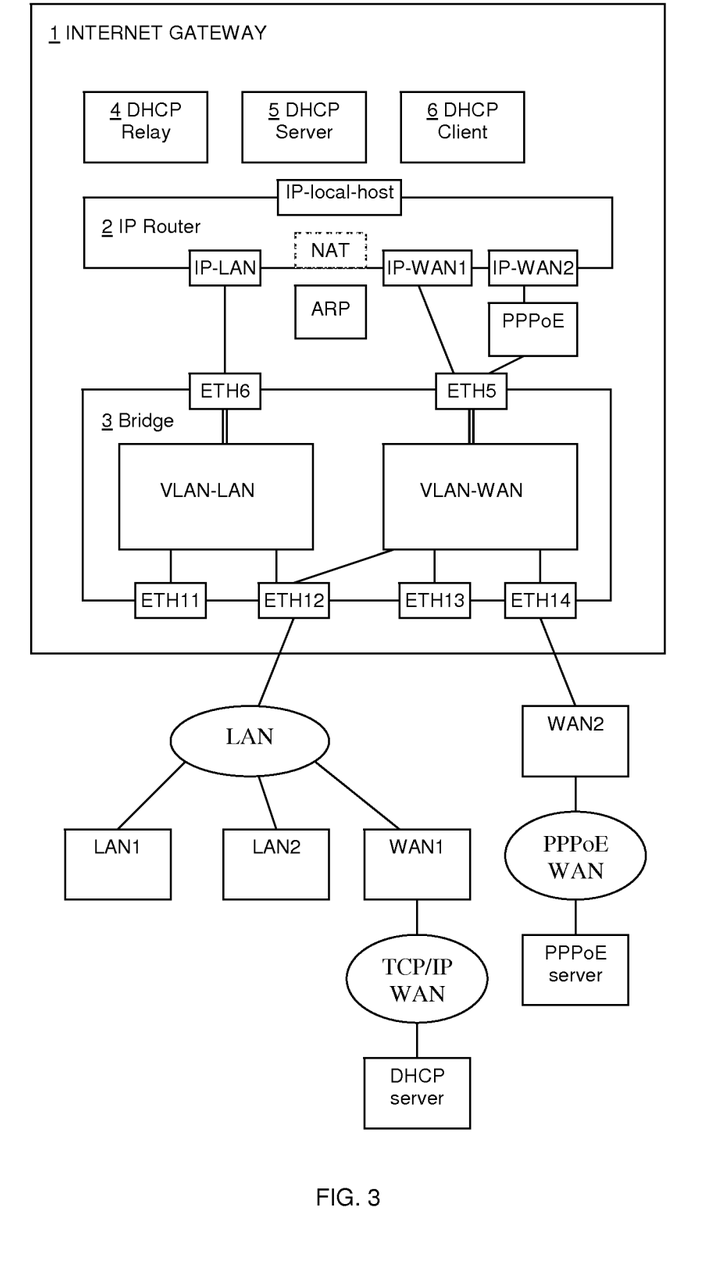
FIG. 3 is a block diagram of the device according to another embodiment.

The gateway according to this embodiment is illustrated in the FIG. 3. It comprises the same modules as the gateway device of the FIG. 2. The difference with the gateway of the FIG. 2 is the fact that a port may be connected to multiple VLANs. The port ETH12 is connected to the VLAN-LAN and the VLAN-WAN. Two LAN devices, LAN1 and LAN2, as well as the WAN device WAN1, are connected to the port ETH12 of the gateway. They are connected through the local area network LAN.

When a LAN device LAN1 is connected to the gateway, it sends out a DHCP-discover to request an IP address. The DHCP-discover, which is broadcast, is received by the gateway DHCP-relay. The DHCP-relay notices the DHCP messages are arriving from a port belonging to VLAN-WAN. The DHCP-relay configures the bridge to consider MAC addresses of LAN1 device as belonging to VLAN-LAN. In addition, port ETH12 is configured to belong to VLAN-LAN in addition to VLAN-WAN. As the gateway DHCP-relay and DHCP server did not respond to the DHCP-discover, the LAN1 device resends DHCP-discover messages as part of the standard DHCP protocol behavior. The bridge now treats LAN1 device as belonging to VLAN-LAN; the DHCP-relay then notices the DHCP-discover messages are arriving via the router VLAN-LAN interface. It forwards the messages to the gateway DHCP server.

Whenever the LAN device needs to send an IP packet to the Internet, outside of the private network, it sends the packet to the Ethernet MAC address ETH12 of the gateway. The bridge of the gateway considers any data sent by LAN devices based upon their source MAC address as belonging to VLAN-LAN, it looks at the MAC learning table and delivers all data with destination MAC address ETH12 to the Gateway VLAN-LAN interface EHT6. LAN traffic arrives at the gateway at its IP-LAN interface.

An Internet connection is established via sending a PPPoE PADI or DHCP-discover message over all bridge interfaces considered as being WAN interfaces, i.e. belonging to VLAN-WAN. A PPPoE or DHCP server on the Internet responds with offering a public IP address; and the gateway selects the more appropriate WAN for Internet connectivity, as defined above.

A gateway may then comprise a single interface as such. The interface may connect to a bridge that enables then to connect the gateway to a local area network comprising LAN or WAN devices. The gateway is automatically configured.

With a LAN side IP interface receiving all LAN data and a WAN IP interface having a public IP address and connection to an Internet, the gateway can perform all Internet Gateway functions: route IP packets, perform QoS, perform NAT for the public IP address (translating all LAN device private IP addresses), perform firewall functions, perform parental control.

The invention claimed is:

1. A networking device comprising a plurality of identical interfaces being adapted to connect to either of a Wide Area Network, WAN, or a Local Area Network, LAN, the WAN providing access to a broadband network, all of the identical interfaces being preliminarily preconfigured to be WAN interfaces for accessing said WAN, comprising:
   changing means for, upon receipt of a discover message from a LAN device connected on a preconfigured WAN interface, dynamically modifying said preconfigured WAN interface to become a LAN interface,
   identifying means for requesting an access to the broadband network through all of said plurality of identical interfaces simultaneously by broadcasting a discover message, and for identifying an interface that receives a response to the discover message as a WAN interface for accessing said WAN, and
   selecting means for, if more than one WAN interface for connecting to the WAN has been identified, selecting based on a selection rule one WAN interface for accessing said broadband network, wherein said selection rule is configured to be amended by a remote configuration for selecting a first interface for accessing said broadband network as a third network.

2. The device according to claim 1, wherein said selecting means is adapted to set up the selection rule for selecting a WAN interface for accessing the broadband network, and is adapted to apply the selection rule to said detected WAN interfaces.

3. The device according to claim 1, wherein the identifying means is adapted to identify an interface to a LAN, said interfaces connected to the LAN being LAN interfaces, and is adapted to request an access to the broadband network through all said all interfaces but the LAN interfaces.

4. The device according to claim 3, comprising means for identifying the reception of a traffic specific to said LAN.

5. The device according to claim 1, further comprising at least an interface adapted to simultaneously access said WAN and said LAN.

6. The device according to claim 5, wherein the identifying means is adapted to identify a second device connected to an interface, said second device being adapted to connect to the LAN.

7. A method for accessing a broadband network through a Wide Area Network, WAN, in a device comprising a plurality of identical interfaces adapted to connect to either of the WAN or a Local Area Network, LAN, said interface connected to said WAN being a WAN interface, comprising at the device:
   preconfiguring all of the identical interfaces preliminarily as WAN interfaces for accessing said WAN,
   upon receipt of a discover message from a LAN device connected on a preconfigured WAN interface, dynamically changing said preconfigured WAN interface to become a LAN interface,
   simultaneously broadcasting a discover message for requesting access to the broadband network to all said interfaces of the plurality of identical interfaces,
   receiving an answer to the discover message from one or more interfaces, identified as WAN interfaces for accessing said WAN, and
   selecting, based on a selection rule, an interface, among said WAN interfaces, to access said broadband network, wherein said selection rule is configured to be amended by a remote configuration for selecting a first interface for accessing said broadband network as a third network.

8. A gateway device comprising a plurality of identical interfaces being adapted to connect to either of a Local Area Network, LAN, or a Wide Area Network, WAN, the WAN providing access to a broadband network, all of the identical interfaces being preliminarily preconfigured to be WAN interfaces for accessing said WAN, comprising:
   changing means for, upon receipt of a discover message from a LAN device connected on a preconfigured WAN interface, dynamically modifying said preconfigured WAN interface to become a LAN interface,
   identifying means for requesting an access to the broadband network through all of said interfaces of the plurality of interfaces simultaneously by broadcasting a discover message, and for identifying an interface that receives a response to the discover message as a WAN interface for accessing said WAN, and
   selecting means for, if more than one WAN interface for connecting to the WAN has been identified, selecting, based on a selection rule, one WAN interface for accessing the broadband network, wherein said selection rule is configured to be amended by a remote configuration for selecting a first interface for accessing said broadband network as a third network.

9. The gateway device according to claim 8, said identifying means being adapted to classify an interface that does not receive a response to the request as a LAN interface.

* * * * *